No. 875,310. PATENTED DEC. 31, 1907.
J. I. AYER.
AUDIBLE ALARM FOR ELECTRIC COOKING VESSELS.
APPLICATION FILED JAN. 14, 1907.

Witnesses:
Edward Maxwell.
M. J. Spalding.

Inventor:
James I. Ayer,
By Geo. J. P. Maxwell,
His Attorney.

UNITED STATES PATENT OFFICE.

JAMES I. AYER, OF CAMBRIDGEPORT, MASSACHUSETTS, ASSIGNOR TO SIMPLEX ELECTRIC HEATING COMPANY, OF BOSTON, MASSACHUSETTS, A CORPORATION OF MASSACHUSETTS.

AUDIBLE ALARM FOR ELECTRIC COOKING VESSELS.

No. 875,310.  Specification of Letters Patent.  Patented Dec. 31, 1907.

Application filed January 14, 1907. Serial No. 352,149.

*To all whom it may concern:*

Be it known that I, JAMES I. AYER, a citizen of the United States, residing at Cambridgeport, in the county of Middlesex and State of Massachusetts, have invented an Improvement in Audible Alarms for Electric Cooking Vessels, of which the following description, in connection with the accompanying drawings, is a specification, like letters on the drawings representing like parts.

In closed vessels, especially such as cooking vessels, where steam is generated and the water is liable to boil away to the injury of the vessel, it is desirable to have provision for notifying the attendant when the steam has risen to high pressure. The employment of electricity which has now become so general in connection with specially devised vessels for heating water for various purposes, has rendered forcibly apparent the necessity for some automatic audible alarm, as the electric current, being silent and concealed, affords no outward manifestation of its presence or of the degree of heat or otherwise, so that the user cannot readily tell even whether the current is turned on or off, and hence it often happens that the first notification a servant girl or other user of the device has that she has not given it proper attention is the melting and falling to pieces of the expensive electric heating vessel, from which the contained water may long since have evaporated.

Accordingly my present invention is a simple means for audibly notifying the attendant when such a vessel has reached the condition when it needs attention; and to this end I have provided a special top, containing a more or less shrill whistle, so that whenever the top is in place and the apparatus in operation it must necessarily notify the servant or user the instant that steam is generated in volume.

Figure 1:
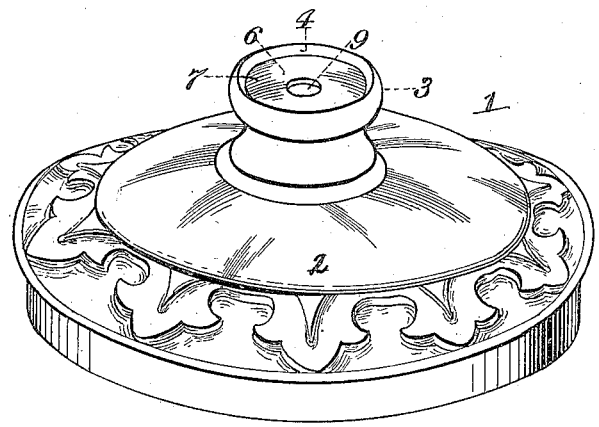
Figure 2:
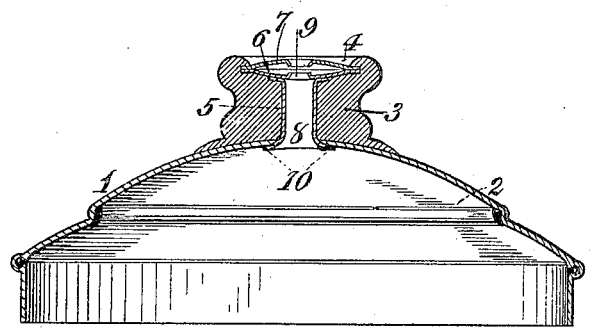

In the accompanying drawings I have shown a preferred embodiment of my invention, Figure 1 being a perspective view thereof; and Fig. 2 a central vertical cross-sectional view.

It will be understood that the shape and kind of cover or closing device 1 will vary to suit the utensil or vessel with which it is used. The body portion 2 of the cover is usually of metal and above this I provide a wooden or other non-heat-conducting knob 3 countersunk at 4 and provided with a central vertical opening 5. In the recess or countersink 4 I secure a flat whistle 6 having its top convex surface 7 preferably approximately flush with the top surface of the knob, so that it presents an exceedingly neat appearance and at the same time is protected from injury. To the underside of the whistle 6 I secure a tube 8 arranged in line with the whistle opening 9, said tube 8 projecting downward through the knob 3 and having its lower end at 10 reamed over into retaining engagement against the metal of the body 2, thereby firmly holding together the whistle, knob and cover proper.

My invention is not merely simple in construction and operation, but it is so located that it must necessarily be always in operative position whenever the vessel is closed and also it must necessarily receive the full blast of steam from the body of water or liquid beneath the cover.

In use, let it be supposed that the cover is on a teapot, the moment that the water has reached the desired degree of heat the steam therefrom will announce the fact by blowing the whistle 6, whereupon the heating electric current is at once turned off, thereby saving the current and preventing any possible injury to the pot; whereas without the audible signal the user would not be able to know when the right moment had arrived for turning off the current, without repeatedly removing the cover to ascertain the condition of the water.

Having described my invention, what I claim as new and desire to secure by Letters Patent is, 1. A cover provided with a knob having at its outer side a whistle having a rounded top-side extending substantially flush with the top outer end of the knob and containing a central perforation affording communication between the whistle and the interior of the cover, the knob having a raised protecting rim recessed on its inner wall to hold the whistle.

2. A cover provided with a knob having at its top side a flat countersunk recess, a flat whistle mounted flatwise in said recess substantially flush with the top surface of the knob, and a tube secured at its upper end to said whistle and thence passing through the knob and secured at its lower end to the cover and serving as the means of connecting the whistle, knob and cover together.

In testimony whereof, I have signed my name to this specification, in the presence of two subscribing witnesses.

JAS. I. AYER.

Witnesses:
ELIZABETH M. CONLIN,
DORA A. PROCTOR.